US008971959B2

(12) United States Patent
Hunt et al.

(10) Patent No.: US 8,971,959 B2
(45) Date of Patent: Mar. 3, 2015

(54) MOUNTING SYSTEM FOR ATTACHING MOBILE DEVICES TO SPORTS EQUIPMENT

(71) Applicant: Field Logic, Inc., Superior, WI (US)

(72) Inventors: Fred Hunt, Duluth, MN (US); Mark Wippler, Hoyt Lakes, MN (US)

(73) Assignee: Field Logic, Inc., Superior, WI (US)

( * ) Notice: Subject to any disclaimer, the term of this patent is extended or adjusted under 35 U.S.C. 154(b) by 315 days.

(21) Appl. No.: 13/623,298

(22) Filed: Sep. 20, 2012

(65) Prior Publication Data

US 2013/0288743 A1 Oct. 31, 2013

Related U.S. Application Data

(60) Provisional application No. 61/639,547, filed on Apr. 27, 2012.

(51) Int. Cl.
*H04W 88/02* (2009.01)
*H04B 1/38* (2006.01)

(52) U.S. Cl.
USPC .................... 455/557; 455/556.1; 455/575.6; 455/90.3

(58) Field of Classification Search
USPC ............... 455/556.1, 557, 566, 575.1, 575.6, 455/90.1, 90.3, 550.1, 67.11, 67.13; 42/111, 119, 95; 245/176.1; 124/89, 73
See application file for complete search history.

(56) References Cited

U.S. PATENT DOCUMENTS

| 2,111,368 | A | 3/1938 | Saul |
| 5,181,323 | A | 1/1993 | Cooper |
| 5,398,176 | A | 3/1995 | Ahuja |
| 5,566,951 | A | 10/1996 | Dart et al. |
| 6,144,308 | A | 11/2000 | Dunne |
| 6,269,581 | B1 | 8/2001 | Groh |
| 6,286,796 | B1 | 9/2001 | Pugliesi |
| 6,352,227 | B1 | 3/2002 | Hathaway |
| 6,449,419 | B1 | 9/2002 | Brough et al. |
| 7,255,035 | B2 | 8/2007 | Mowers |
| 8,282,493 | B2 | 10/2012 | Román et al. |
| 8,353,455 | B1 | 1/2013 | Huang |
| 2004/0016058 | A1 | 1/2004 | Gardiner et al. |
| 2007/0199226 | A1 | 8/2007 | Handel |
| 2007/0236384 | A1 | 10/2007 | Ivtsenkov et al. |
| 2008/0112698 | A1* | 5/2008 | Ray ................................ 396/56 |
| 2008/0192979 | A1 | 8/2008 | Bee |
| 2009/0060473 | A1 | 3/2009 | Kohte et al. |
| 2010/0115778 | A1 | 5/2010 | Gorsuch et al. |
| 2011/0173869 | A1* | 7/2011 | Uhm ............................... 42/111 |
| 2012/0046100 | A1 | 2/2012 | Román et al. |
| 2012/0092490 | A1* | 4/2012 | Kley ............................. 348/142 |
| 2012/0151815 | A1 | 6/2012 | Tate |

(Continued)

*Primary Examiner* — John J Lee
(74) *Attorney, Agent, or Firm* — Stoel Rives LLP

(57) ABSTRACT

A mounting system for attaching a mobile device having a mobile device camera and an interface to sports equipment during use of such sports equipment. The mounting system includes a cradle adapted to retain the mobile device without obstructing operation of the mobile device camera or interfering with access to the interface. A pivoting joint attaches the cradle to an extension arm that permits the cradle to be moved in pitch, yaw, and roll relative to the extension arm. One or more mounting structures are provided to pivotally attach the extension arm to the sports equipment so that the interface is oriented toward and accessible by a user of the sports equipment, and the mobile device camera is oriented to capture user's perspective during use of the sports equipment. At least one sport-specific software application is loaded on the mobile device.

15 Claims, 9 Drawing Sheets

(56) References Cited

U.S. PATENT DOCUMENTS

2012/0251982 A1 10/2012 Hester et al.
2013/0111798 A2 5/2013 Russell
2013/0275894 A1* 10/2013 Bell et al. ...................... 715/764

* cited by examiner

MOUNTING SYSTEM FOR ATTACHING MOBILE DEVICES TO SPORTS EQUIPMENT

RELATED APPLICATIONS

The present application claims the benefit of U.S. Provisional Application Ser. No. 61/639,547 entitled Phone Cradle with a Mounting Device Specifically Mounted to an Archery Bow or Gun, filed Apr. 27, 2012, the entire disclosures of which is hereby incorporated by reference.

FIELD OF THE INVENTION

The present disclosure is directed to a mounting system that merges the functionality of a mobile device, such as a smart phone or mobile device with video capabilities, to sports equipment, such as for example, an archery bow or a gun. One or more sport-specific software applications are installed on the mobile device that is complementary to the specific sport and/or the sports equipment being used. The mounting system orients the mobile device to capture video of the sports equipment in use, generally from the user's perspective, without impeding the user's view. The viewing screen and interface of the mobile device are oriented toward, and available for use by, the user during operation of the sports equipment.

BACKGROUND OF THE INVENTION

Humans use a wide variety of projectile firing devices. The vast majority of these devices are optically sighted by the user. There is a growing movement by users of such devices to record their activities using video, and then "share" their video with other people using e-mail, text messaging, or social networking sites. To date, this has been done using special purpose cameras designed to be mounted to a piece of sporting equipment such as a helmet or bicycle handlebars, such as for example, GoPro cameras available at www.gopro.com.

The user typically must modify the mount system to attach the camera to a bow or firearm. While this is functional, the modified mounts lack rigidity and are not user friendly. In addition, the user must take the camera home, attach it to a personal computer to download the video, edit the video, and change the format to an up-loadable format. Only then can the video be shared with other users.

Other companies have attempted to mount traditional video cameras to bows and firearms. This approach also requires a personal computer to download, edit and upload the video to share with others. In addition, this method suffers from the issues implicit in using a home video camera in the field, such as the physical size and weight of the camera, and the delicacy of a home video camera that was designed to be used in an indoor environment free of shock and vibration. Both of the above methods generally mount to the stabilizer hole on a bow so the user has little or no control of the picture being taken, resulting in misalignment with the target not being centered or even missed completely.

BRIEF SUMMARY OF THE INVENTION

Mobile device technology, such as for example the Apple iPhone and Droid, contain some of the functionality found in digital video cameras, telecommunications equipment, and personal computers. This functionality includes taking still and video images, editing the images, texting the images, emailing the images and written descriptions, sharing the images and written descriptions to social networking sites such as Facebook, reviewing video and still images.

The present disclosure merges the functionality of a mobile device, such as a smart phone or mobile device with video capabilities, to sports equipment, such as for example, an archery bow, firearm, bicycle, helmet, and the like. One or more sport-specific software applications are installed on the mobile device that is complementary to the specific sport and/or the sports equipment being used. The mounting system orients the mobile device to capture video of the sports equipment in use, generally from the user's perspective, without impeding the user's view. The viewing screen and interface of the mobile device are oriented toward, and available for use by, the user during operation of the sports equipment.

The mounting device includes a cradle that safely and securely holds a variety of mobile devices, such as an I-phone. The cradle leaves the operating buttons, speakers, and microphones on the mobile device accessible by the user.

The present mounting device allows sportsmen to use their phone to film their hunts from the "user's perspective". The mounting device allows the hunter to view shot placement immediately after firing the shot. The present mounting can also be used as a training device for hunters.

One embodiment is directed a mounting system that includes a cradle adapted to retain the mobile device without obstructing operation of the mobile device camera or interfering with access to the mobile device interface. A pivoting joint connects the cradle to an extension arm that permits the cradle to be moved in pitch, yaw, and roll relative to the extension arm. One or more mounting structures are provided to pivotally attach the extension arm to the sports equipment so that the interface is oriented toward and accessible by a user of the sports equipment, and the mobile device camera is oriented to capture user's perspective during use of the sports equipment.

The cradle can be oriented generally parallel to the sports equipment when not in use. The cradle includes adjustable brackets adapted to accommodate different size mobile devices. In one embodiment, the cradle includes a three-point attachment system to retain the mobile device. The cradle preferably engages edges of the mobile device.

The present disclosure is also directed to a mounting system for attaching a mobile device to a riser on an archery bow. The mounting structure pivotally attaches the extension arm to the archery bow so that the interface is oriented toward a user of the bow and the mobile device camera is oriented generally along a line of sight of the user of the bow.

The mounting system permits the mobile device camera to be oriented generally coincident with an expected impact point of an arrow shot from the archery bow. The user can access the interface on the mobile device with one hand while holding the bow with the other hand.

One or more sport-specific software applications are installed on the mobile device that is complementary to the specific sport and/or the sports equipment being used. The mobile device can be programmed to provide one or more of sport-specific training, education, and coaching for the user; evaluate or enhance the user's performance; inform the user about the sport or the particular sports equipment; maintain compliance with regulatory or legal requirements for the sport; simulate game calls for hunters; provide targeting data for the shooter, such as images of game animal vital organs or sight mark generation; superimpose data and images on an actual image of the target; provide real-time sport-specific data, such as scoring the user's shots, estimating the distance to the target, identifying the target species, size and weight, or estimating shot ballistics.

The present disclosure is also directed to a system for capturing images while using an archery bow. The system includes a mobile device programmed to evaluate accuracy of arrows shot by the user, keeping score of user's shots, shooting form of the user, ballistics of the arrow during flight, distance to a target, target identification, or species of an animal target. The cradle retains the mobile device without obstructing operation of a mobile device camera or interfering with access to an interface on the mobile device. The pivoting joint attaches the cradle to an extension arm that permits the cradle to be moved in pitch, yaw, and roll relative to the extension arm. One or more mounting structures pivotally attaches the extension arm to the archery bow so that the interface is oriented toward a user of the bow and the mobile device camera is oriented generally along a line of sight of the user.

The present disclosure is also directed to a method for attaching a mobile device having a mobile device camera and an interface to an archery bow. The method includes attaching the mobile device to a cradle adapted to retain the mobile device without obstructing operation of a mobile device camera or interfering with access to an interface on the mobile device. The cradle is attached to an extension arm by a pivoting joint that permits the cradle to be moved in pitch, yaw, and roll relative to the extension arm. The extension arm is attached to one or more mounting structures adapted to pivotally attach the extension arm to the archery bow so that the interface is oriented toward a user of the bow and the mobile device camera is oriented generally along a line of sight of the user.

The method includes rotating the cradle toward the archery bow when not in use. The method also includes programming the mobile device to evaluate accuracy of arrows shot by the user, keeping score of user's shots, shooting form of the user, ballistics of the arrow during flight, distance to a target, target identification, or species of an animal target. The extension arm preferably positions the mobile device on the opposite side of the bow from the bow sight, offset from the riser. The offset is sufficient to protect the mobile device from being impacted by the bow string.

The hinges and pivots include a securing feature to retain the mobile device is the desired configuration. The securing feature is typically a threaded member that creates friction to prevent further rotation.

DETAILED DESCRIPTION OF THE INVENTION

Figure 1A:
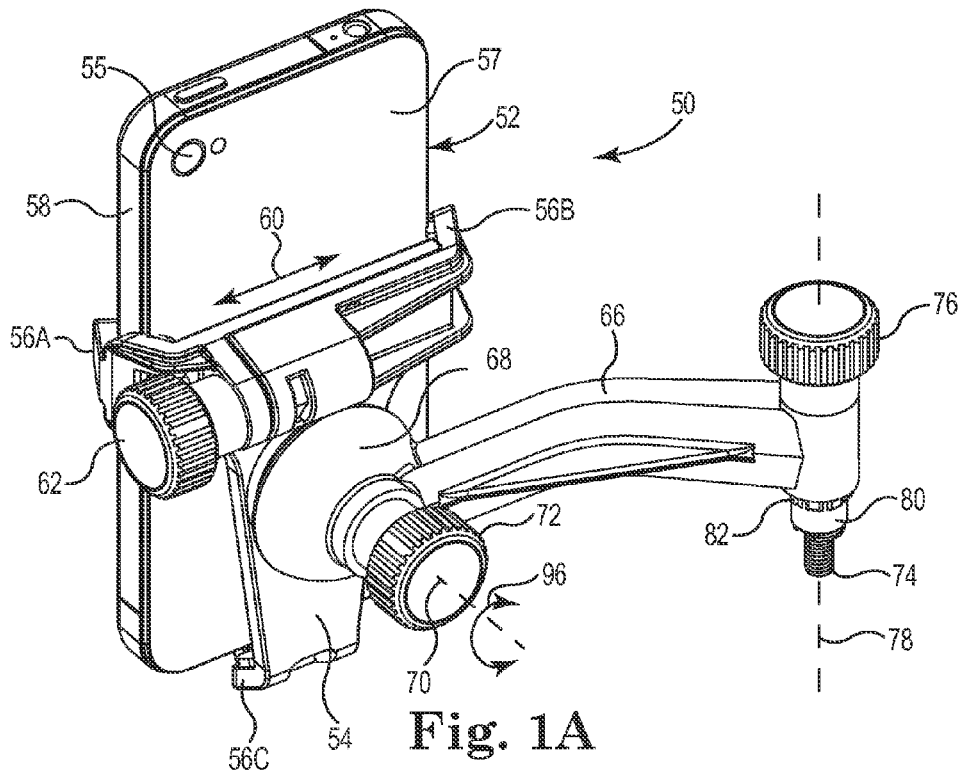
FIG. 1A is a rear perspective view of a mounting system for attaching a mobile device to sports equipment in accordance with an embodiment of the present disclosure.
Figure 1B:
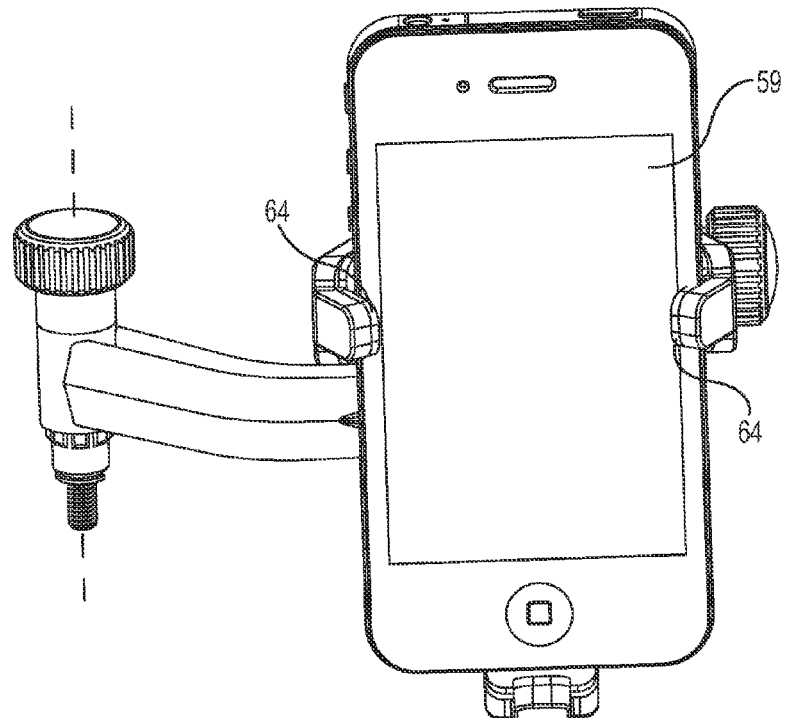
FIG. 1B is a front perspective view of the mounting system for attaching a mobile device to sports equipment of FIG. 1A.

FIGS. 1A and 1B are rear and front perspective views of mounting system 50 for attaching mobile device 52 to sports equipment in accordance with an embodiment of the present disclosure. As used herein, "mobile device" refers to a smart phone, cell phone, or other portable telecommunications enabled device.

Cradle 54 includes a plurality of brackets 56A, 56B, 56C ("56") designed to grasp edges 58 of the mobile device 52. Side bracket 56B and bottom bracket 56C are fixed relative to the cradle 54. Bracket 56A is moveable along axis 60 by rotating thumb screw 62. The brackets 56 are preferably lined with an elastomeric material 64 to cushion the interface with the mobile device 52. The elastomeric material 64 preferably has a Shore hardness of about 60 to about 90 measured according to ASTM D2240 type A.

The cradle 54 is attached to extension arm 66 by ball joint 68. The ball joint 68 permits the cradle 54 to articulate and rotate around axis 70. In particular, the ball joint 68 permits the cradle 54 to be moved in pitch, roll and yaw relative to the extension arm 66. Thumb screw 72 is rotated to secure the cradle 54 in the desired orientation with respect to the extension arm 66.

The cradle 54 is designed to not obstruct camera 55 located on rear surface 57 of the mobile device 52 shown in FIG. 1A. Similarly, the brackets 56 do not interfere with operation or access to interface, such as touch screen 59 shown in FIG. 1B.

Threaded member 74 coupled to thumb screw 76 is used to secure the extension arm 66 to the sports equipment. Extension arm 66 also rotates around axis 78 of shaft 80. Internal sleeve 82 is preferably interposed between the shaft 80 and the extension arm 66 to control the torque required to rotate the mounting system 50 relative to the axis 78.

Figure 2:
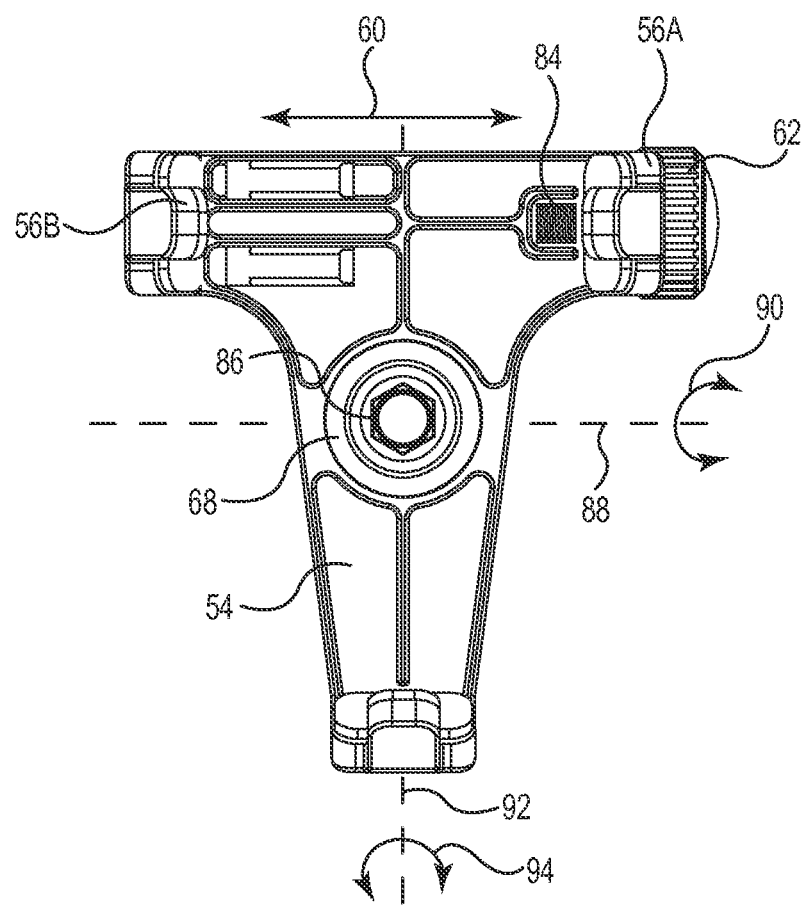
FIG. 2 is a front view of a cradle for a mobile device in accordance with an embodiment of the present disclosure.

FIG. 2 is a front view of the cradle 54 with the mobile device 52 removed for clarity. The thumb screw 62 is used to rotate threaded member 84, which moves the bracket 56A back and forth along the axis 60.

Fastener 86 for the ball joint 68 is secured to the cradle 54, such as by a hexagonal recess. Turning the thumb screw 72 counterclockwise frees to cradle 54 to move around axis 88 (pitch 90), around axis 92 (roll 94), or around axis 70 (yaw 96) relative to the pivoting arm 66. Rotating the thumb screw 72 clockwise secures the cradle 54 in the desired location relative to the pivoting arm 66.

Figure 3A:
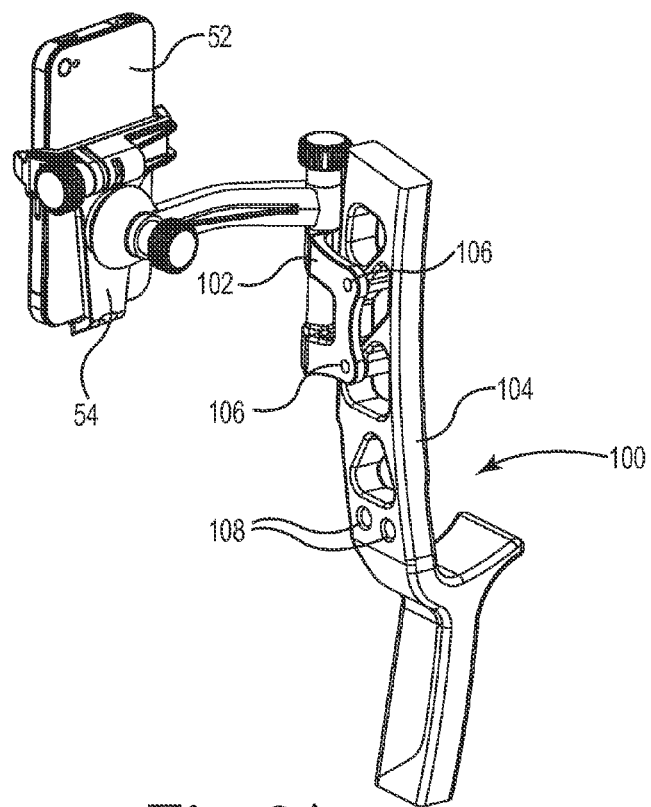
FIG. 3A is a rear perspective view of a mounting system attaching a mobile device to an archery bow in accordance with an embodiment of the present disclosure.
Figure 3B:
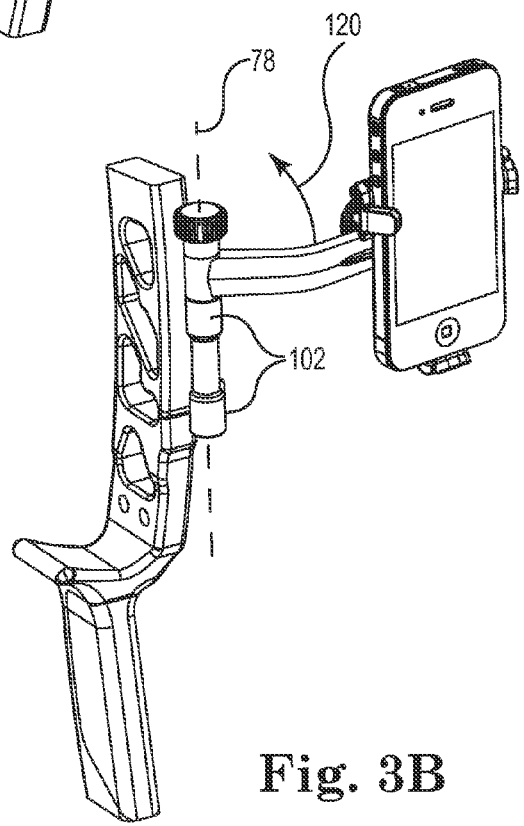
FIG. 3B is a front perspective view of the mounting system attaching a mobile device to an archery bow of FIG. 3A.

FIGS. 3A and 3B are rear and front perspective view of mounting system 50 attaching the mobile device 52 to an archery bow 100 in accordance with an embodiment of the present disclosure. Bracket 102 is mounted to riser 104 using fasteners 106. In one embodiment, the bracket 102 is attached to the two bow sight and accessory mounting holes found on most compound bows, such as disclosed in Archery Manufacturers Organization Standards, 1987 Edition ("AMO Standards"). For example, the AMO Standards set forth two 10-24 threaded holes, 0.250" depth spaced apart about 1.3125". Alternatively, the bracket 102 can be attached to the stabilizer and accessory mounting holes 108

Figure 4:
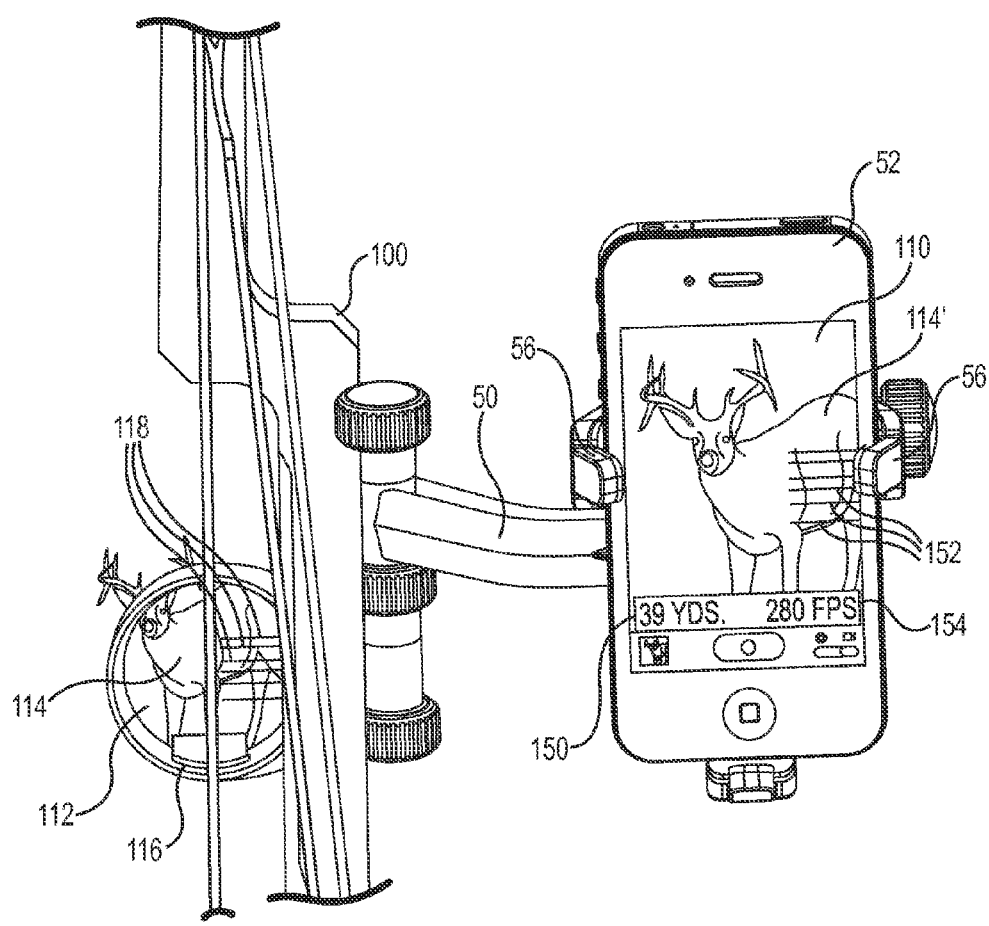
FIG. 4 illustrates a mobile device mounted to an archery bow from the user's perspective in accordance with an embodiment of the present disclosure.

FIG. 4 illustrates the archery bow 100 from a user's perspective. The mounting system 50 retains the mobile device 52 oriented towards the user such that touch screen 110 is generally in the sight path of the user, without impeding the view 112 of the target 114 through the sighting devices 116. When properly oriented the screen 110 will display in image 114' of the target 114 seen through the sighting device 116 having sight pins 118. The brackets 56 do not interfere with the user's access to the touch screen 110 so the user can access the interface for the mobile device 52. The user can access the touch screen 110 with one hand while holding the bow 100 with the other hand to operate the bow 100. The present mounting system 50 permits a mobile device 52, such as a smart phone or cell phone, to operate as a virtual heads-up display for the user.

The mobile device 52 can be programmed to perform a variety of operations, such as for example, evaluating accuracy of arrows shot by the user, scoring of user's shots, shooting form of the user, ballistics of the arrow during flight, distance to a target, target identification, or species of an animal target. Operation of the camera 55 is optionally voice activated prior to firing a shot so the user maintains use of both hands.

As used herein, "user's perspective" refers to a field of view of a user while using a particular type of sports equipment. Different sports equipment has different user's perspectives. For example, for a bow or firearm the user's perspective is the line of sight of the shooter. For a bicycle the user's perspective is that of a user riding the bicycle. For various vehicles the user's perspective is that of the user driving the vehicle.

Figure 5:
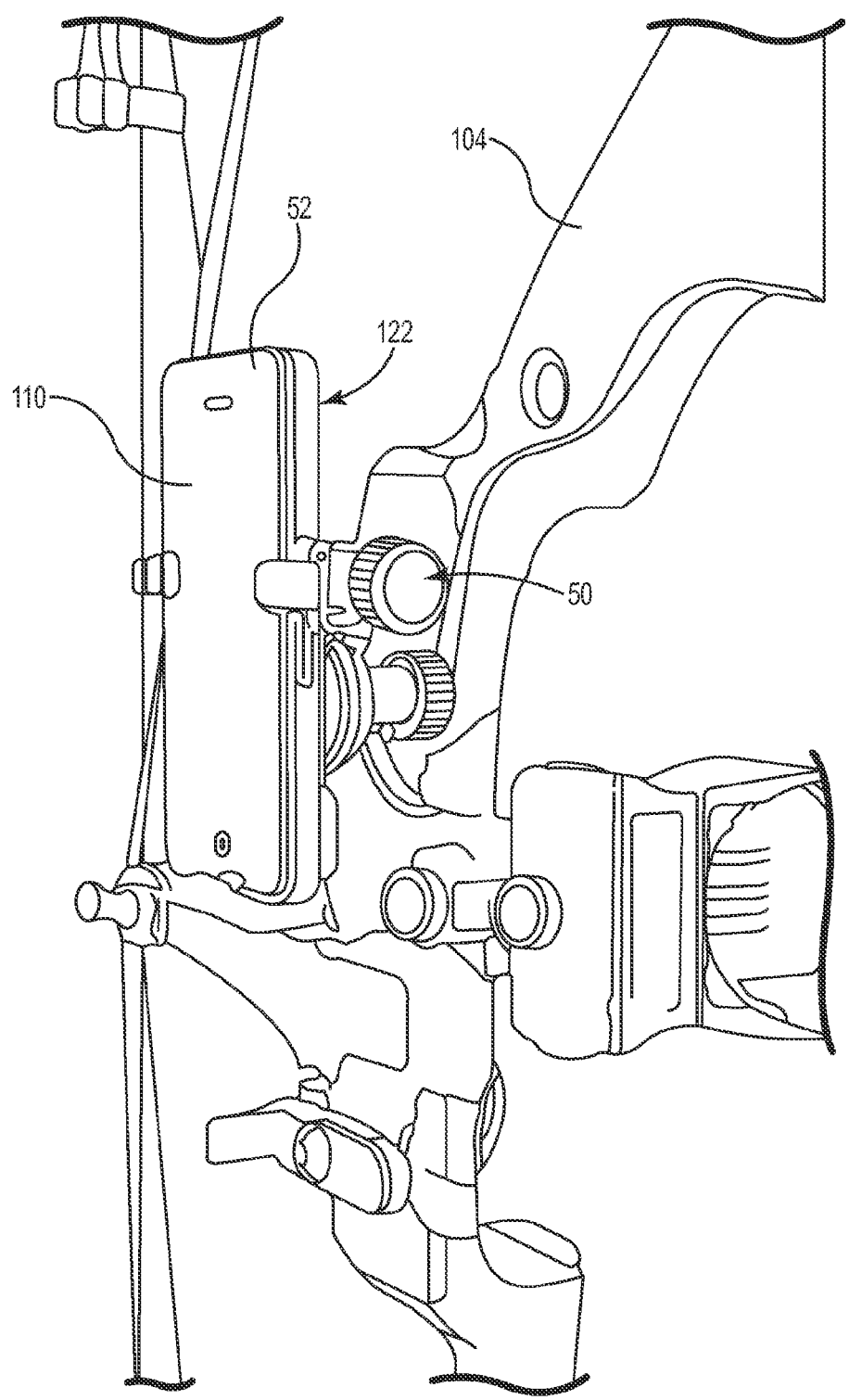
FIG. 5 illustrates a mobile device mounted to an archery bow in a folded configuration in accordance with an embodiment of the present disclosure.

FIG. 5 illustrates the mobile device 52 folded against the riser 104 when not in use. In particular, the extension arm 66 is rotated in direction 120 (see FIG. 3B) around axis 78 in a folded position 122 so that touch screen 110 is generally adjacent to the plane of the riser 104. When in the folded positioned 122 the bow 100 will fit in most bow cases without having to remove the mounting device 50.

Figure 6A:
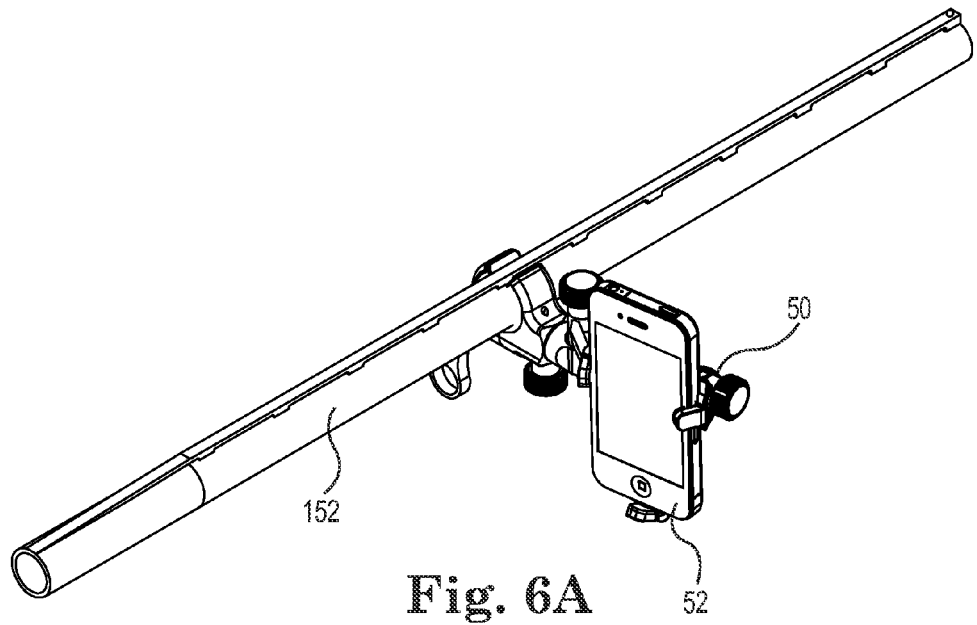
FIG. 6A is a front perspective view of a mounting system attaching a mobile device to a shot gun barrel in accordance with an embodiment of the present disclosure.
Figure 6B:
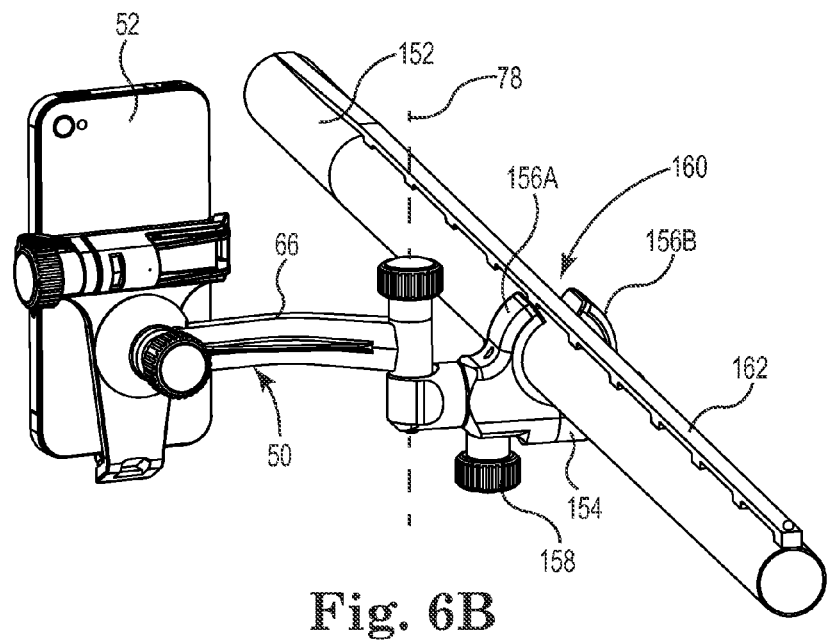
FIG. 6B is a rear perspective view of the mounting system attaching a mobile device to the shot gun barrel of FIG. 6A.

FIGS. 6A and 6B are front and rear perspective view of mounting system 50 attaching the mobile device 52 to barrel 152 of a long gun in accordance with an embodiment of the present disclosure. Bracket 154 includes two semi-circular clamps 156A, 156B ("156") that form an approximately 80% circle when tightened together with supplied thumb screw 158. The 20% opening 160 is intended to accommodate rib 162 on the barrel 152. The semi-circular clamps 156 are lined with an elastomeric material that cushions the compressive force applied to the barrel 152. The extension arm 66 rotates around axis 78 as discussed herein. In an alternate embodiment, the claims 156 on the bracket 154 can be adapted to mount to a picatiny rail of many firearms.

Figure 7A:
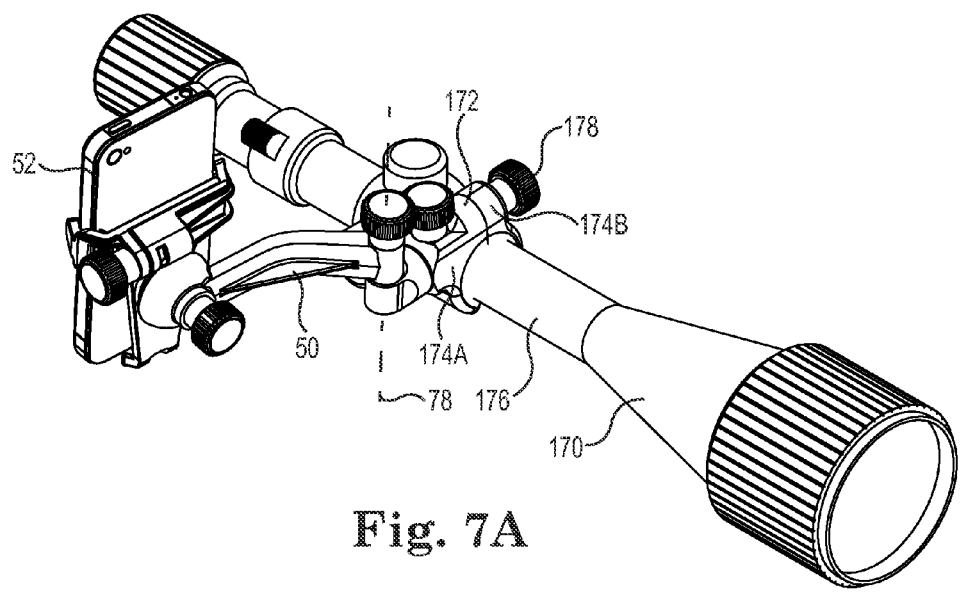
FIG. 7A is a front perspective view of a mounting system attaching a mobile device to a telescopic sight in accordance with an embodiment of the present disclosure.
Figure 7B:
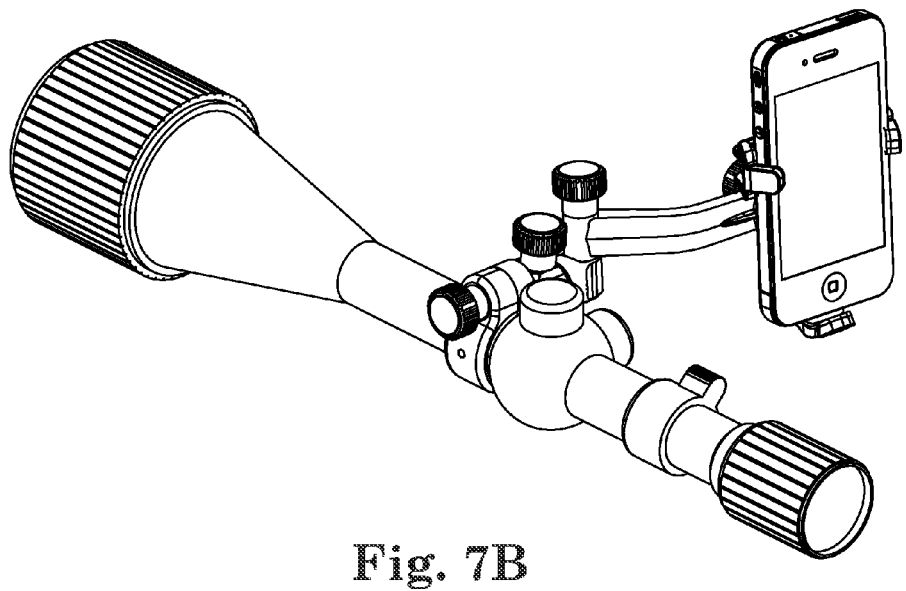
FIG. 7B is a rear perspective view of the mounting system attaching a mobile device to the telescopic sight of FIG. 7A.

FIGS. 7A and 7B are front and rear perspective view of the mounting system 50 attaching the mobile device 52 to sight 170 in accordance with an embodiment of the present disclosure. Bracket 172 includes two semi-circular clamps 174A, 174B ("174") that encircle tube 176 of the sight 170. Thumb screw 178 tightens the clamps 174 to the tube 176. The extension arm 66 rotates around axis 78 as discussed herein.

The semi-circular claims 156, 174 of FIGS. 6 and 7 can be adapted to attach the present mounting device to any tubular structure, including handle bars of a bicycle, motor cycle, all-terrain vehicles, a ski pole, fishing rods, and the like.

The potential of the present mounting system is fully realized by installing one or more sport-specific software applications on the mobile device 52. As used herein, "sport-specific application" refers to software for a mobile device 52 that augments or enhances a sporting activity or sports equipment. The sport-specific application can perform a variety of functions, such as providing sport-specific training, education, and coaching for the user; evaluating or enhancing the user's performance; informing the user about the sport or the particular sports equipment; maintaining compliance with regulatory or legal requirements for the sport; simulating game calls for hunters; providing targeting data for the shooter, such as images of game animal vital organs or sight mark generation; superimposing data and images on an actual image of the target; providing real-time sport-specific data, such as scoring the user's shots, estimating the distance to the target, identifying the target species, size and weight, estimating shot ballistics, and the like. The telecommunications link provided by the mobile device 52 allows all of these functions to be updated on real-time basis, and the sporting activity to be monitors and communicated instantly anywhere in the world.

The present mounting system permits a linkage of sports equipment with the functionality of mobile devices 52. It will be appreciated that the present mounting system is a platform for continuously adding new features and functions for the user and the chosen sport.

With reference to archery and bow hunting, for example, the hunting experience can be greatly enhances by adding one of the following sport-specific applications to the mobile device 52.

Educational information—The mobile device 52 can be programmed to provide educational content for bow hunters, including shooting form and techniques, setups, gear selection, access to hunting forums and blogs, and the like. A mobile device 52 application for this purposes is sold under the trade name Realtree Archery Tips.

Figure 8:
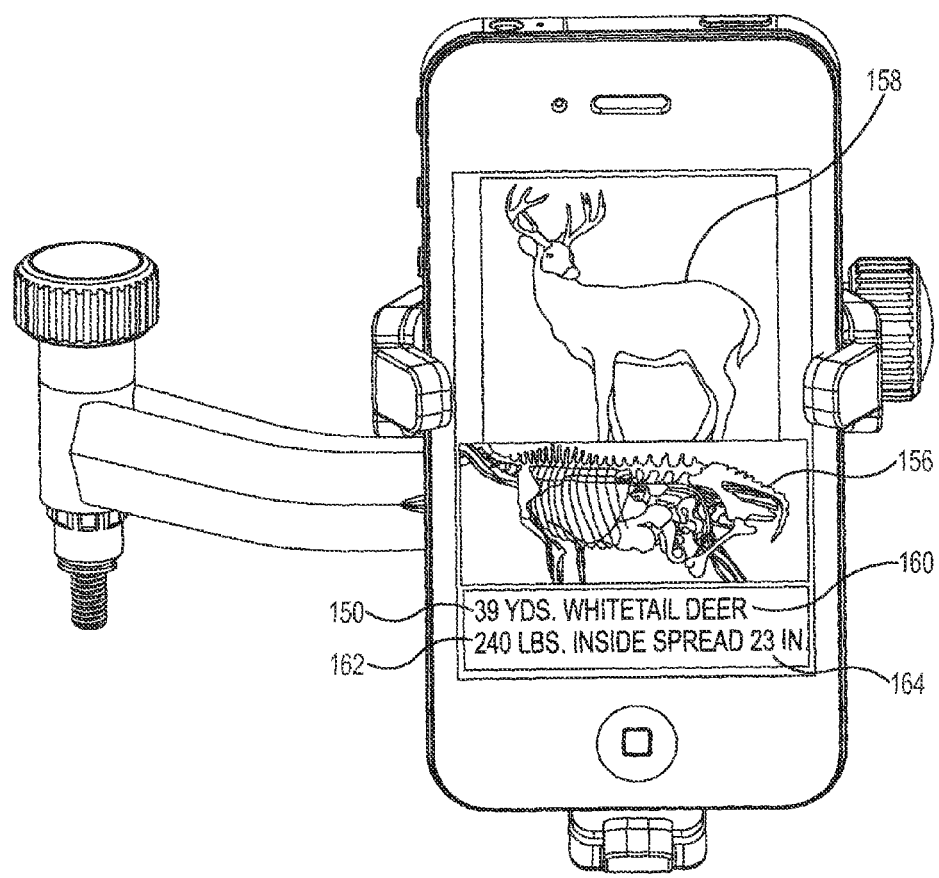
FIG. 8 illustrates sport-specific data displayed on the mobile device for the use in accordance with an embodiment of the present disclosure.

Range finder function—The mobile device 52 can provide a range finding function that estimates distance 150 the range to the target, as illustrated in FIGS. 4 and 8. For example, a software application sold under the trade name Range Finder Field Helper evaluates the distance between the user and the target based on the principle of trigonometry and based on embedded sensors in the mobile device 52. Parameters can be added for any type of target or game animal.

Sight mark generation—The mobile device 52 can be programmed to generate ballistic sight marks 152 on a real-time basis, as illustrated in FIG. 4. The resulting sight marks can compensate for shooting variables, such as weather and shooter fatigue. The program preferably has a calibration function to calibrate the sight marks 152 with the sight pins 118 on the sighting device 116. In one embodiment, the user fires an arrow using one of the sight pins 118 and then aligns the corresponding sight mark 152 with the impact point of the arrow. A software application sold under the trade name Archer's Mark calculates sight marks for target sights.

Ballistic calculator—The mobile device 52 can be programmed to calculate ballistic parameters, such as for example, arrow speed 154 (see FIG. 4), kinetic energy based on individual arrows, arrow balance, and the like. A software application sold under the trade name Archery Pal calculates archery ballistics. A software application sold under the trade name Mil-Dot Ballistics provides firearm range estimation based on mil-dot and real time ballistics calculations.

Game animal targeting—Hunting game animal with a bow requires knowledge of the optimum trajectory through the vital organs. The mobile device 52 can optionally display a 3D simulation 156 of the vital organs of the target game animal 158 to increase the likelihood of a clean shot. The mobile device 52 preferably selects the 3D simulation 156 based on digital analysis identifying the game animal 158. A software application sold under the trade name Shot Simulator displays a 3D simulation of the vital organs of a deer and the desired trajectory through the deer.

Figure 9:
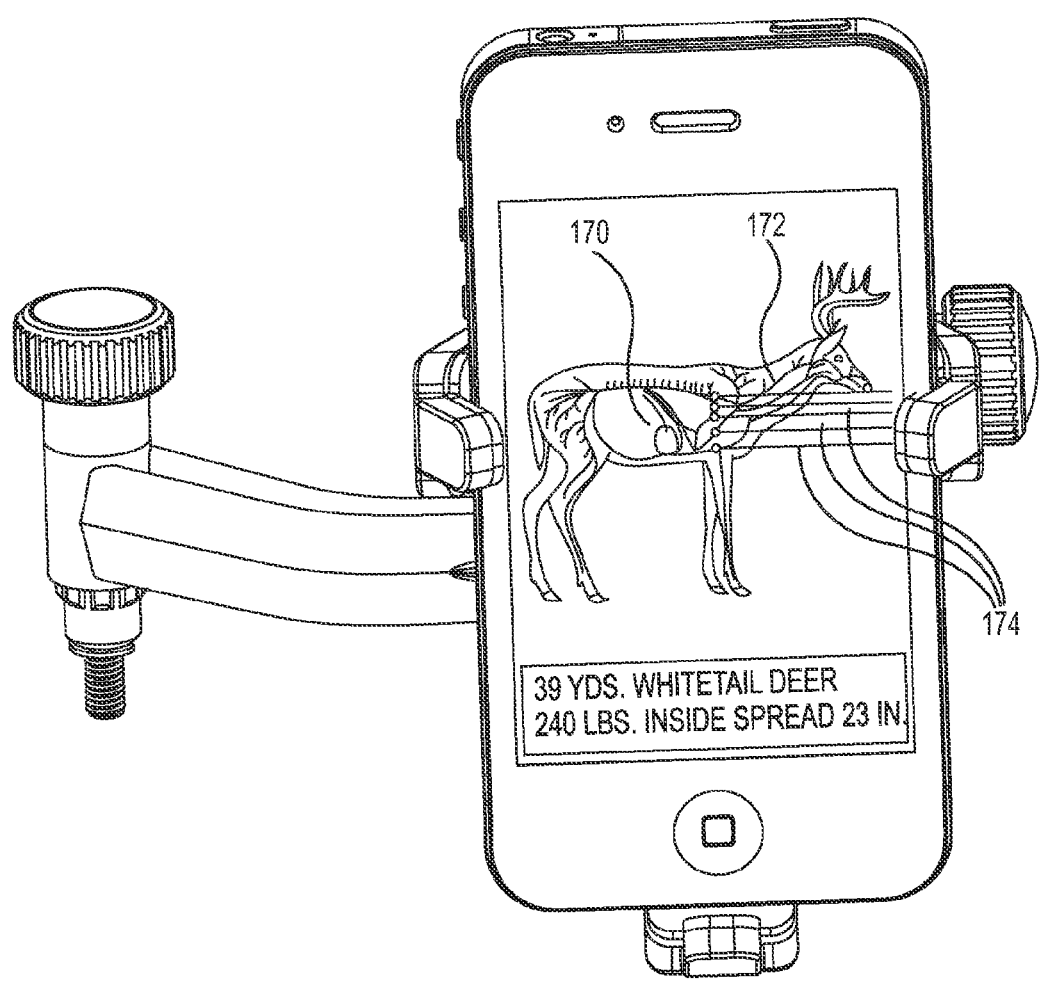
FIG. 9 illustrates a targeting image superimposed on an actual image of a game animal displayed on the mobile device for the use in accordance with an embodiment of the present disclosure.

As illustrated in FIG. 9, an image 170, such as a 3D simulation of the vital organs, is superimposed on an actual image of the game animal 172. Ballistic sight marks 174 are optionally superimposed on the actual image of the game animal 172 on a real-time basis. Calibration of the sight marks 174 with the sight pins 118 on the sighting device 116 permits the user to aim the bow with either the mobile device 52 or the sighting device 116.

Species identification—The camera in the mobile device 52 can conduct a visual review of a game animal to automatically identify species 160, as illustrated in FIG. 8. In another embodiment, the mobile device 52 can approximate age, weight 162, height, inside spread of the antlers 164, and other characteristics of the game animal, and display any of these variables on the touch screen 59.

Scoring—The mobile device 52 can be programmed to function as an electronic score card, such as for FITA, NFAA Field and NFAA Indoor competitions. The mobile device 52 optionally analyzes the impact point of the arrow relative to the target and automatically records the score. A software application sold under the trade name Archery Score Free permits the user to create custom shots for varying distances and target size, stores past arrow placement, and the like.

Tracking shooting hours—The mobile device 52 can be programmed to automatically determine the hunter's location, applicable hunting regulations for that location, and calculate Sunrise and Sunset (and shooting hours) for various types of game. The mobile device 52 can automatically notify the user of the opening and closing of shooting hours, reducing the risk of non-compliance with local hunting laws.

Hunting regulations—Hunting regulations vary between jurisdictions. The mobile device 52 can be programmed to calculate current location using the GPS function and then display the relevant hunting regulations for the target game animal at that location. For example, a software application sold under the trade name Sportsmanregs Big Game Regulations permits the hunter to verify compliance with hunting regulation while in the field.

Shooting parameters—The mobile device 52 can be programmed to track shooting parameters for the bow, arrows, strings, and sights for future reference and analysis. For example, a software application sold under the trade name Archery Memo software keeps track of sight marks, nocking points, brace height, and arrow shaft spine.

Elapsed time and split time—Hunters, law enforcement officers, and military personnel often track elapsed time to the first shot and split time between shots to improve shooting skills. A software application sold under the trade name Sure-Fire ShotTimer displays the elapsed time and the split time for every shot fired.

Game calls—The speaker in the mobile device 52 can be used to simulate game calls. The microphone on the mobile device 52 can monitor the calls from the target animals and automatically select the desired simulated game call response. A software application sold under the trade name Primos Hunting Calls provides an interactive game calls for deer, elk, turkey, waterfowl, etc.

Linking mobile devices—The mobile devices 52 mounted in the present mounting system can be linked to another mobile device 52. For example, a software application sold under the trade name Hunting Call Remote allows the user to control a hidden mobile device 52 to transmit a remote game call.

Where a range of values is provided, it is understood that each intervening value, to the tenth of the unit of the lower limit unless the context clearly dictates otherwise, between the upper and lower limit of that range and any other stated or intervening value in that stated range is encompassed within this disclosure. The upper and lower limits of these smaller ranges which may independently be included in the smaller ranges is also encompassed within the disclosure, subject to any specifically excluded limit in the stated range. Where the stated range includes one or both of the limits, ranges excluding either both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the various methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present disclosure is not entitled to antedate such publication by virtue of prior invention. Further, the dates of publication provided may be different from the actual publication dates which may need to be independently confirmed.

Other embodiments are possible. Although the description above contains much specificity, these should not be construed as limiting the scope of the disclosure, but as merely providing illustrations of some of the presently preferred embodiments. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form varying modes disclosed. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

What is claimed:

1. A mounting system for attaching a mobile device having a mobile device camera and an interface to a barrel of a firearm during use of the firearm, the mounting system comprising:
    a cradle adapted to retain the mobile device without obstructing operation of the mobile device camera or interfering with access to the interface;
    a pivoting joint attaching the cradle to an extension arm that permits the cradle to be moved in pitch, yaw, and roll relative to the extension arm; and
    one or more mounting structures adapted to pivotally attach the extension arm to the firearm so that the interface is oriented toward and accessible by a user of the firearm, and the mobile device camera is oriented to capture user's perspective during use of the firearm.

2. The mounting system of claim 1 wherein the cradle can be oriented generally parallel to the firearm when not in use.

3. The mounting system of claim 1 wherein the cradle comprises adjustable brackets adapted to accommodate different size mobile devices.

4. The mounting system of claim 1 wherein the cradle comprises a three-point attachment system to retain the mobile device.

5. The mounting system of claim 1 wherein the cradle engaged edges of the mobile device.

6. The mounting system of claim 1 comprising one or more software applications installed on the mobile device adapted to provide one or more of firearm-specific training, education, and coaching for the user; evaluate or enhance the user's performance; inform the user about the firearm; maintain compliance with regulatory or legal requirements for the firearm; simulate game calls for hunters; provide-targeting data for the shooter; display images of game animal vital organs or sight mark generation; superimpose data and images on an actual image of the target; provide real-time firearm-specific data; score the user's shots; estimate the distance to the target identify the target species, size and weight; or estimate shot ballistics.

7. The mounting system of claim 1 comprising one or more software applications installed on the mobile device adapted to provide one or more of sport-specific training, education, and coaching for the user; evaluate or enhance the user's performance; inform the user about the sport or the particular sports equipment; maintain compliance with regulatory or legal requirements for the sport; simulate game calls for hunters; provide targeting data for the shooter; display, images of game animal vital organs or sight mark generation; superimpose data and images on an actual image of the target; provide real-time sport-specific data score, the user's shots; estimate the distance to the target; identify the target species, size and weight; or estimate shot ballistics.

8. A mounting system for attaching a mobile device having a mobile device camera and an interface to an archery bow, the mounting system comprising:
    a cradle adapted to retain the mobile device without obstructing operation of the mobile device camera or interfering with access to the interface;
    a pivoting joint attaching the cradle to an extension arm that permits the cradle to be moved in pitch, yaw, and roll relative to the extension arm; and
    one or more mounting structures adapted to pivotally attach the extension arm to a riser on the archery bow so that the interface is oriented toward a user of the archery bow and the mobile device camera is oriented generally along a line of sight of the user while shooting arrows.

9. The mounting system of claim 8 wherein the mobile device camera is oriented generally coincident with an expected impact point of an arrow shot from the archery bow.

10. The mounting system of claim 8 wherein the user can access the interface on the mobile device with one hand while holding the archery bow with the other hand.

11. A system for capturing images while using an archery bow, the system comprising:
    a mobile device programmed to include at least one sport-specific software application;
    a cradle adapted to retain the mobile device without obstructing operation of a mobile device camera or interfering with access to an interface on the mobile device;
    a pivoting joint attaching the cradle to an extension arm that permits the cradle to be moved in pitch, yaw, and roll relative to the extension arm; and
    one or more mounting structures adapted to pivotally attach the extension arm to the archery bow so that the interface is oriented toward a user of the archery bow and the mobile device camera is oriented generally along a line of sight of the user.

12. A method for attaching a mobile device having a mobile device camera and an interface to an archery bow, the method comprising the steps of:
    attaching the mobile device to a cradle adapted to retain the mobile device without obstructing operation of a mobile device camera or interfering with access to the interface on the mobile device;
    attaching the cradle to an extension arm with a pivoting joint that permits the cradle to be moved in pitch, yaw, and roll relative to the extension arm; and
    attaching the extension arm to one or more mounting structures adapted to pivotally attach the extension arm to the archery bow so that the interface is oriented toward a user of the archery bow and the mobile device camera is oriented generally along a line of sight of the user.

13. The method of claim 12 comprising rotating the cradle toward the archery bow when not in use.

14. The method of claim 12 comprising programming the mobile device to evaluate accuracy of arrows shot by the user, keeping score of users shots, shooting form of the user, ballistics of the arrow during flight, distance to a target, target identification, or species of an animal target.

15. The method of claim 12 comprising the step of loading at least one sport-specific software application to the mobile device that provides one or more of sport-specific training, education, and coaching for the user; evaluate or enhance the user's performance; inform the user about the sport or the particular sports equipment; maintain compliance with regulatory or legal requirements for the sport; simulate game calls for hunters; provide targeting data for the shooter; display, images of game animal vital organs or sight mark generation; superimpose data and images on an actual image of the target; provide real-time sport-specific data; score the user's shots; estimate the distance to the target; identify the target species, size and weight; or estimate shot ballistics.

* * * * *